United States Patent [19]

Finn

[11] Patent Number: 5,706,344
[45] Date of Patent: Jan. 6, 1998

[54] ACOUSTIC ECHO CANCELLATION IN AN INTEGRATED AUDIO AND TELECOMMUNICATION SYSTEM

[75] Inventor: Brian M. Finn, Madison, Wis.

[73] Assignee: Digisonix, Inc., Middleton, Wis.

[21] Appl. No.: 626,208

[22] Filed: Mar. 29, 1996

[51] Int. Cl.$^6$ .............................. H04M 9/00; G10K 11/16
[52] U.S. Cl. .................. 379/410; 379/406; 379/411; 379/388; 381/71; 381/94
[58] Field of Search .......................... 379/410, 406, 379/411, 420, 444, 159, 167, 388, 389; 381/71, 94, 66

[56] References Cited

U.S. PATENT DOCUMENTS

| | | | |
|---|---|---|---|
| 4,677,676 | 6/1987 | Eriksson | 381/71 |
| 5,033,082 | 7/1991 | Eriksson et al. | 379/410 |
| 5,131,047 | 7/1992 | Hashimoto et al. | 381/71 |
| 5,216,721 | 6/1993 | Melton | 381/71 |
| 5,216,722 | 6/1993 | Popovich | 381/71 |
| 5,222,084 | 6/1993 | Takahashi | 370/32.1 |
| 5,226,088 | 7/1993 | Winterer et al. | 381/94 |
| 5,245,664 | 9/1993 | Kinoshite et al. | 381/71 |
| 5,305,307 | 4/1994 | Chu | 370/32.1 |
| 5,313,945 | 5/1994 | Friedlander | 128/653.2 |
| 5,323,459 | 6/1994 | Hirano | 381/66 |
| 5,325,437 | 6/1994 | Doi et al. | 381/71 |
| 5,327,496 | 7/1994 | Russell et al. | 380/6 |
| 5,337,365 | 8/1994 | Hamabe et al. | 381/71 |
| 5,371,802 | 12/1994 | McDonald et al. | 381/71 |
| 5,381,485 | 1/1995 | Elliott | 381/71 |
| 5,600,718 | 2/1997 | Dent et al. | 379/388 |
| 5,602,928 | 2/1997 | Eriksson et al. | 381/71 |

OTHER PUBLICATIONS

AT&T Digital Processing of Speech Signals, Bell Laboratories, Inc., 1978.

*Primary Examiner*—Krista M. Zele
*Assistant Examiner*—Jacques M. Saint-Surin
*Attorney, Agent, or Firm*—Andrus, Sceales, Starke & Sawall

[57] ABSTRACT

Robust acoustic echo cancellation in a single-channel integrated audio and intercom system is provided by adapting echo cancellation filters in accordance with an optimized autocorrelation matrix. This is carried out in a modified FIR LMS filter in which the adaptation regressor signal is formed by a combination of one or more of the received voice signal, the received audio signal, and/or a random noise signal. In a SISO system, it is usually desirable to shelter the regressor signal from tonal components such as voice signals. In a multiple-channel system, it is usually desirable to shelter regressor signals for a particular channel from acoustic components that are likely to be correlated to acoustic components in other parts of the system and are likely to affect that particular channel. In multi-channel applications, it is therefore usually desirable to shelter regressor signals from audio signals.

22 Claims, 4 Drawing Sheets

ACOUSTIC ECHO CANCELLATION IN AN INTEGRATED AUDIO AND TELECOMMUNICATION SYSTEM

FIELD OF THE INVENTION

The invention relates to acoustic echo cancellation in intercom telecommunication systems, and is particularly well suited for use in vehicles having an integrated audio and intercom system.

BACKGROUND OF THE SUMMARY OF THE INVENTION

The invention arose during continuing development efforts relating to the subject matter of U.S. Pat. Nos. 4,677,676; 5,033,082; 5,216,721; and 5,216,722 and U.S. patent application Ser. No. 08/368,920, all incorporated herein by reference. The invention involves intercom telecommunication systems that use an adaptive filter to cancel acoustic echoes from being transmitted through the system. The invention can be embodied in both single-channel systems and in multiple-channel systems.

A single-channel telecommunication intercom system has a near-end zone and a far-end zone with one speaking location in each zone. A near-end microphone senses sound in the near-end zone and a near-end loudspeaker outputs sound into the near-end zone. A far-end microphone senses sound in the far-end zone and a far-end loudspeaker outputs sound into the far-end zone. The single-channel embodiment of the invention involves combining or summing a voice signal from the far-end microphone with an audio signal from an audio system, and outputting the combined signal to a near-end loudspeaker that introduces the combined voice and audio signal into the near-end zone. An adaptive acoustic echo canceller also receives the combined voice and audio signal. The acoustic echo canceller models the path between the input to the near-end loudspeaker and the output of the near-end microphone, and outputs an echo cancellation signal which is subtracted from the voice signal from the near-end microphone. In this manner, sound introduced into the near-end zone by the near-end loudspeaker (i.e. a combination of the far-end voice signal, the audio signal and/or a random noise signal) is cancelled from being transmitted to the far-end loudspeaker. In accordance with the invention, the acoustic echo canceller is preferably an adaptive FIR filter that is updated using an LMS update in which the regressor signal is formed by a combination of one or more of the following signals: the far-end voice signal, the audio signal and/or a random noise signal. In the single-channel embodiment, it is preferred to shelter the regressor signal from the far-end voice signal to enhance robust adaptation and accurate modeling inasmuch as human speech is typically tonal in nature.

A multi-channel system typically has a plurality of zones wherein each zone has one or more speaking locations. In such a system, the invention is carried out by using a plurality of acoustic echo cancellation channels, each corresponding to an acoustic path between one of the microphones and one of the speakers located within the respective zone. In such a multi-channel system, it is expected that while the audio signals to the various loudspeakers may be different, it is likely that the audio signals will be highly correlated to each other. In accordance with the invention, the regressor signal for each of the adaptive echo cancellation channels is a combination of one or more of the received voice signals for the associated loudspeaker, the audio signal for the associated loudspeaker, and/or a random noise signal from a random noise source. Inasmuch as the audio signals to various loudspeakers within a zone are likely to be correlated, it is desirable in many applications to shelter the regressor signal from the audio signal. However, the audio signal, if present, continues to input the acoustic echo cancellation channels so that echo of the audio signal is cancelled.

It is an object of the invention to provide an integrated intercom and audio system having robust adaptation and accurate acoustic echo cancellation. It is another object of the invention to provide the same in a multi-channel environment. The invention carries out these objects by using regressor signals that are customized depending on the application and operating conditions to optimize robust and accurate adaptation of the acoustic echo cancellation filter.

DETAILED DESCRIPTION OF THE DRAWINGS

Figure 1:
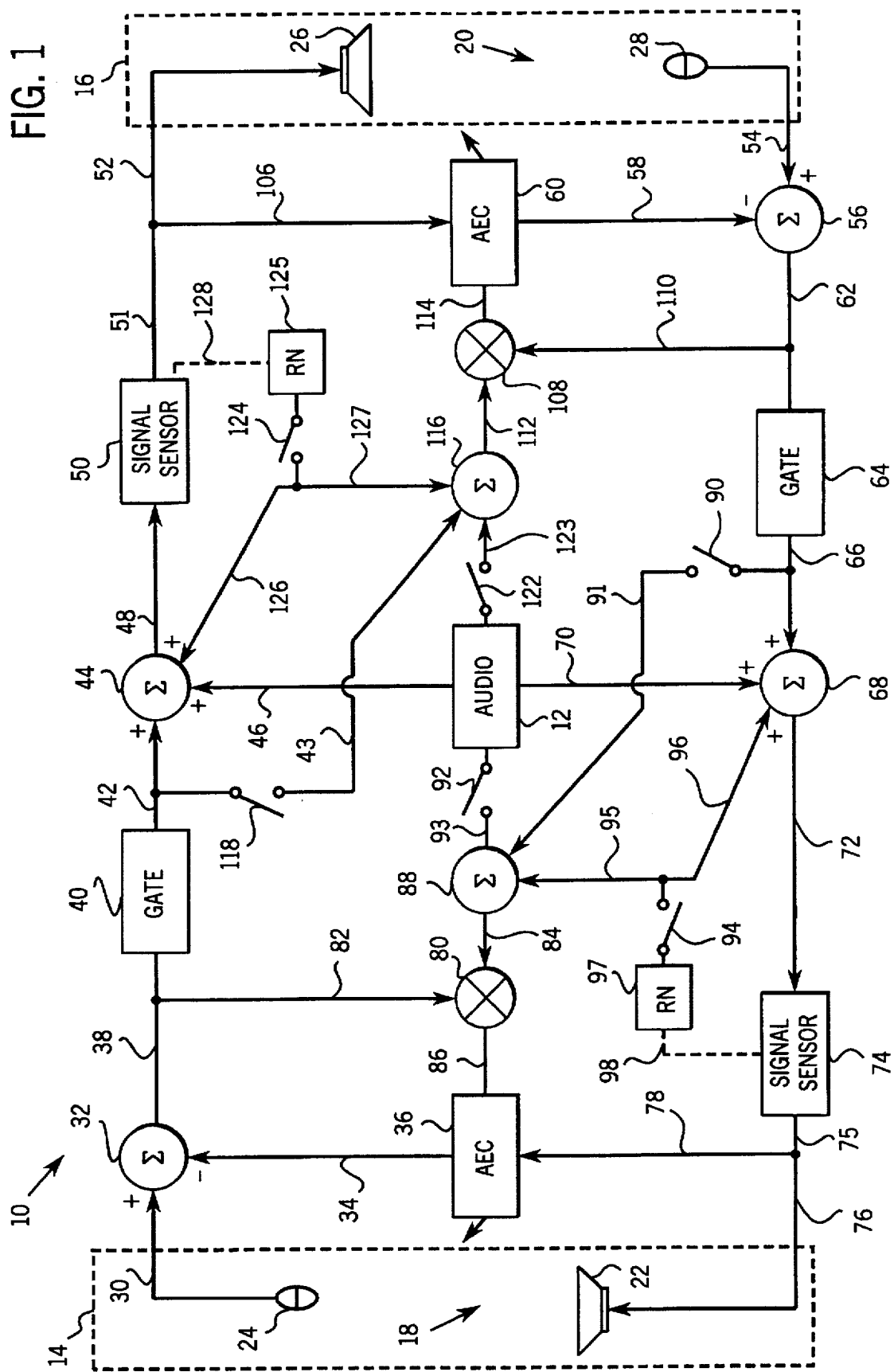
FIG. 1 is a schematic drawing in accordance with the invention showing an integrated intercom and audio system having single-channel acoustic echo cancellers.

FIG. 1 shows a telecommunication intercom system 10 integrated with an audio system 12. The system 10 has a near-end zone 14 and a far-end zone 16. Each zone 14 and 16 may be subject to one or more noises, and those noises may be attenuated in accordance with incorporated U.S. Pat. No. 5,033,082 and U.S. patent application Ser. No. 08/368,920. In FIG. 1, each zone 14 and 16 has one speaking location 18 and 20, respectively. A near-end loudspeaker 22 introduces sound into the near-end zone 14 at the speaking location 18. Near-end microphone 24 senses noise and speech at speaking location 18. Far-end loudspeaker 26 introduces sound into far-end zone 16 at speaking location 20. Far-end microphone 28 senses noise and speech at speaking location 20.

The near-end microphone 24 generates a near-end voice signal which is transmitted through line 30 to a near-end echo cancellation summer 32. The near-end echo cancellation summer 32 also inputs a near-end echo cancellation signal in line 34 from a near-end acoustic echo canceller 36. The near-end echo cancellation summer 32 subtracts the near-end echo cancellation signal in line 34 from the near-end voice signal in line 30 and outputs a near-end echo-cancelled voice signal in line 38. The near-end, echo-cancelled voice signal in line 38 inputs output gate 40. Output gate/switch 40 opens and terminates (or greatly reduces) the transmission of the near-end echo-cancelled voice signal if the signal does not exceed a threshold value. In this manner, a noticeable voice signal will not be transmitted from the near-end microphone 24 to the far-end zone 16 when speech is not present at speaking location 18. A suitable gate/switch 40 uses a short-time, average magnitude estimating function to detect if a voice signal is present in line 38. Other suitable estimating functions are disclosed in *Digital Processing of Speech Signals*, Lawrence R. Rabiner, Ronald W. Schafer, 1978, Bell Laboratories, Inc., Prentice Hall, pages 120–126.

If the echo-cancelled near-end voice signal in line 38 exceeds the threshold value, the signal is transmitted through line 42 to a far-end audio summer 44. The far-end audio summer 44 sums the voice signal in line 42 with an audio signal in line 46 from the audio system 12. The summer 44 outputs the combined voice and audio signal in line 48 to a signal sensor 50 which detects the level of the combined voice and audio signal in a similar manner as output gate/switch 40. The combined near-end voice and audio signal is transmitted from signal sensor 50 to far-end loudspeaker 26 through lines 51 and 52. The far-end loudspeaker 26 introduces sound into zone 16 in response to the combined far-end voice and audio signal.

Far-end microphone 28 generates a far-end voice signal in line 54 which is transmitted to a far-end echo cancellation summer 56. Far-end echo cancellation summer 56 also inputs a far-end echo cancellation signal in line 58 from a far-end acoustic echo canceller 60. The far-end echo cancellation summer 56 subtracts the far-end echo cancellation signal in line 58 from the far-end voice signal in line 54, and outputs an echo-cancelled far-end voice signal in line 62. The echo-cancelled far-end voice signal in line 62 inputs output gate/switch 64 which in most applications is preferably identical to output gate/switch 40. If the signal in line 62 has sufficient magnitude, gate/switch 64 transmits the signal to line 66, and the signal in line 66 inputs audio summer 68. An audio signal in line 70 from the audio system 12 also inputs audio summer 68, and the summer 68 outputs a combined far-end voice and audio signal in line 72. The magnitude of the signal in line 72 is measured by signal sensor 74, and the combined far-end voice and audio signal is transmitted through lines 75 and 76 to near-end loudspeaker 22. The near-end loudspeaker 22 introduces sound into the near-end zone 14 in response to the combined far-end voice and audio signal.

The near-end acoustic echo canceller 36 inputs the combined far-end voice and audio signal from gate 74 through lines 75 and 78. The acoustic echo canceller 36 is preferably an adaptive finite impulse response filter having sufficient tap length to model the acoustic path. The acoustic echo canceller 36 adaptively models the path between the input to near-end loudspeaker 22 and the output from near-end microphone 24. The near-end echo cancellation summer 32 thus subtracts, from the near-end voice signal in line 30, that portion of the signal due to sound introduced by the near-end speaker 22.

The near-end acoustic echo canceller 36 is preferably adapted using an LMS update. To carry out the LMS update, a multiplier 80 inputs the echo-cancelled near-end voice signal from summer 32 through lines 38 and 82. The multiplier 80 also inputs a regressor signal in line 84. The multiplier multiplies the signals in lines 82 and 84 and outputs an update signal in line 86 which is transmitted to the acoustic echo canceller 36 for adaptation.

The regressor signal in line 84 for the near-end adaptive echo canceller 36 is preferably a combination of one or more of the following signals: the far-end voice signal, the audio signal, and/or a random noise signal. In FIG. 1, the structure for carrying out the combination of these signals is depicted by summer 88 and switches 90, 92 and 94. In most applications, it is preferred that the combining operation be carried out in a microprocessor. When switch 90 is closed, the far-end voice signal in line 66 is transmitted through line 91 to summer 88. When switch 92 is closed, the audio signal from the audio source 12 is transmitted through line 93 to summer 88. When switch 94 is closed, random noise from random noise source 97 is transmitted through line 95 to summer 88, and also through line 96 to summer 68. As disclosed in U.S. Pat. No. 4,677,676, the random noise source 97 preferably provides low-level, random noise uncorrelated to any noise or sound introduced to the speaking location in the near-end zone 14. The preferred form is provided by a Galois sequence, although other random, uncorrelated noise sources may be used. Signal sensor 74, which monitors the level of the combined far-end voice and audio signal in line 72, controls whether switch 94 is closed, and also controls the level of random noise from random noise source 97 if the switch 94 is closed, all shown schematically by dashed line 98.

Adaption of the near-end acoustic echo canceller 36 must be frozen when there is near-end talk sensed by microphone 24. Therefore, the near-end acoustic echo canceller 36 should not adapt when the value of the echo-cancelled, near-end voice signal in line 38 exceeds a threshold value in the gate 40. During periods of adaptation, it is preferred for robust adaptation that the signal in line 76 inputting the near-end loudspeaker 22 have an acoustic power spectrum as close to white noise as possible. The input autocorrelation matrix for white noise is well conditioned.

Figure 2:
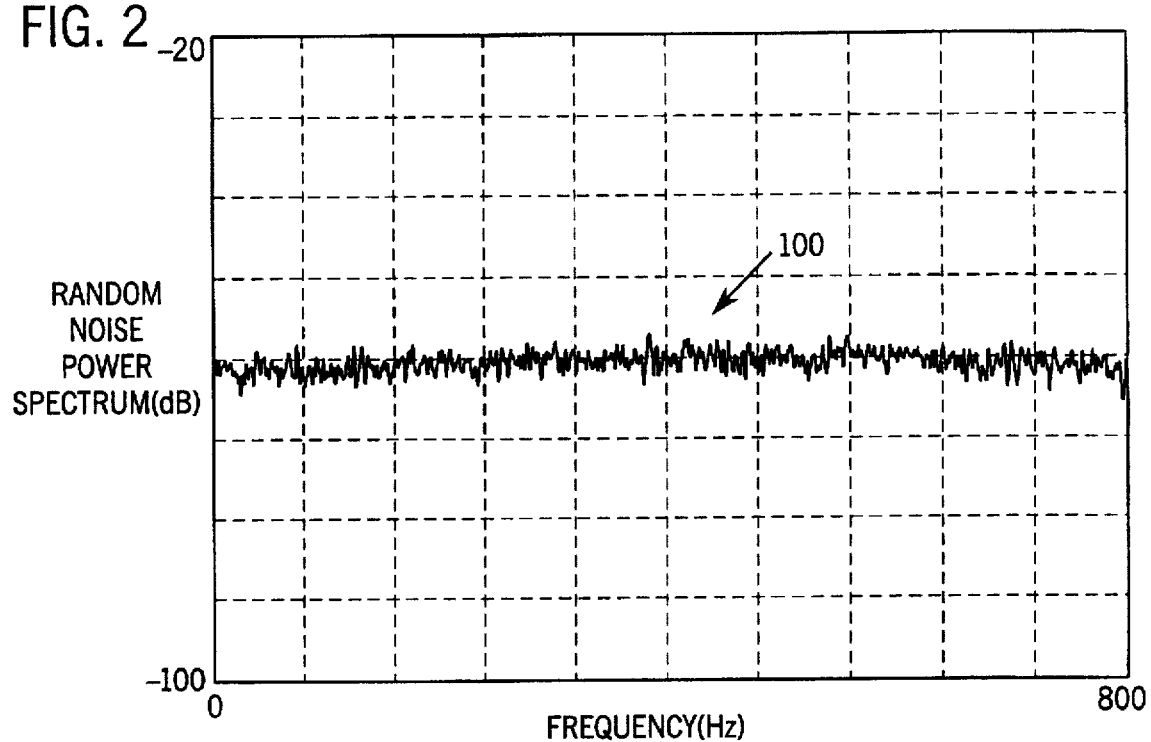
FIG. 2 is a plot illustrating a typical acoustic power spectrum of random noise.
Figure 3:
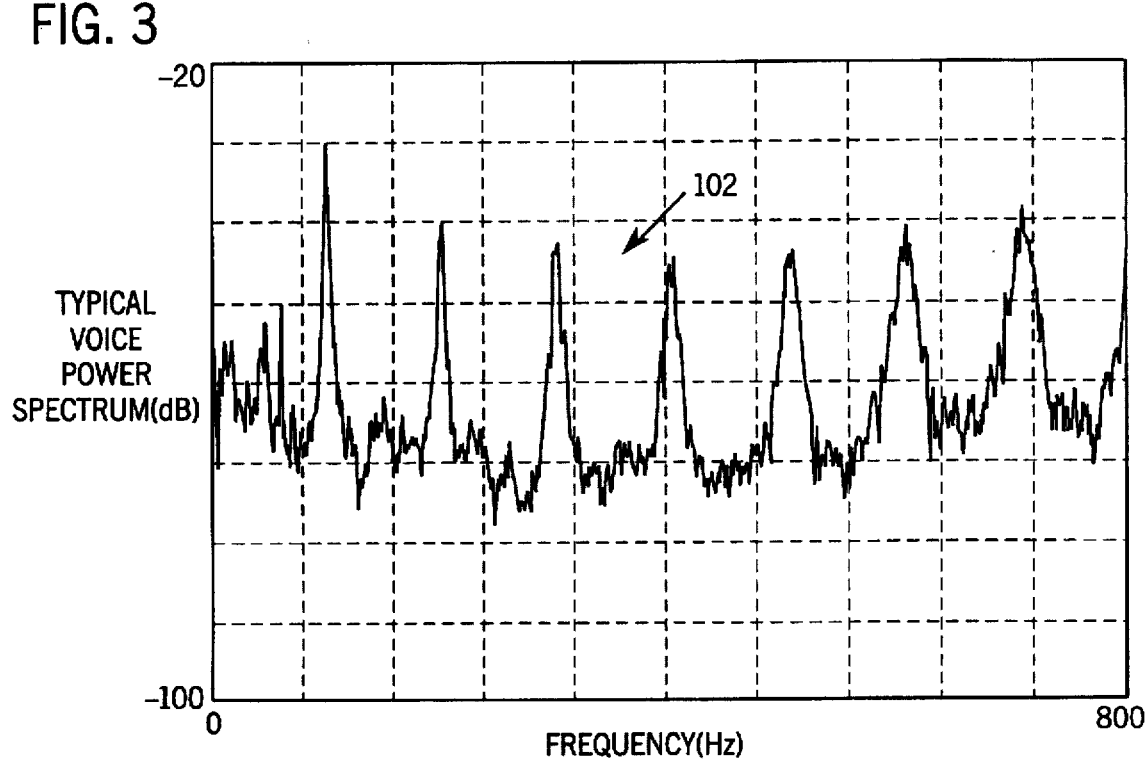
FIG. 3 is a plot illustrating a typical acoustic power spectrum of speech.
Figure 4:
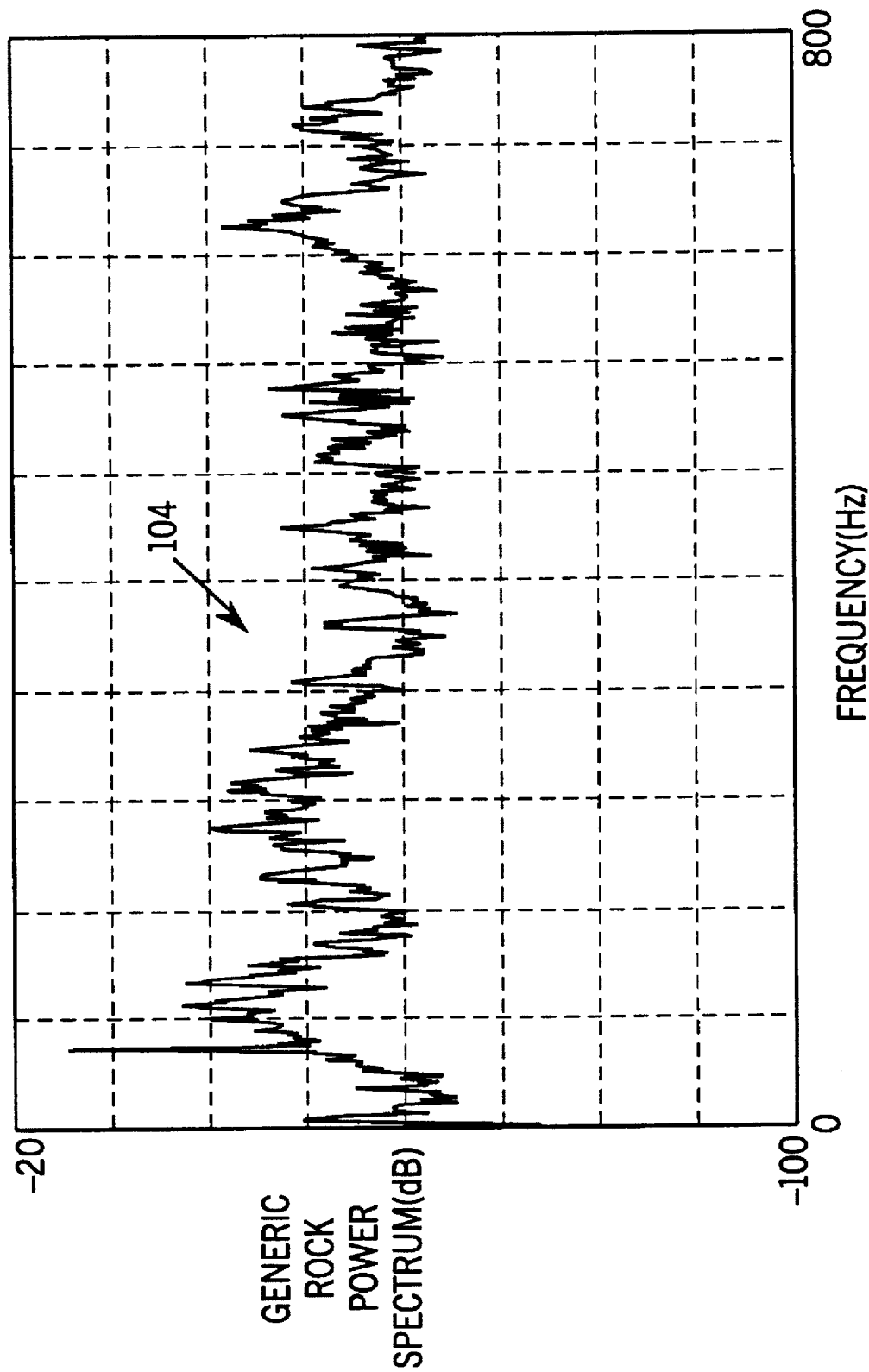
FIG. 4 is a plot illustrating a typical acoustic power spectrum of rock music which can be played through an audio system in a vehicle.

FIG. 2 shows an acoustic power spectrum 100 for a typical sample of random noise. FIG. 3 shows an acoustic power spectrum 102 for a typical sample of speech. FIG. 3 shows a typical acoustic power spectrum 104 for a sample audio signal during a generic rock music selection. The speech spectrum 102 is least ideal for modeling, because its tonal nature implies large eigen value spreads in the input autocorrelation matrix. The music spectrum 104, which is not ideal, is better conditioned for modeling. While random noise 100 is the best suited for robust adaptation, additional random noise 100 is typically not desired in communication systems because adding random noise to signal 76 introduces noise into near-end zone 14.

In accordance with the invention, adaptation of the near-end acoustic echo canceller 36 can be shielded from the audio signal by opening switch 92 or from the far-end voice signal by opening switch 90. In addition, it is desirable to close switch 94 and add random noise to the regressor signal only when the combined far-end voice and audio signal in line 72 is sufficiently large so that the additional random noise will go unnoticed by a person located in near-end zone 14.

The far-end acoustic echo canceller 60 preferably operates in a manner similar to the near-end acoustic echo canceller 36. The far-end acoustic echo canceller 60 inputs the combined near-end voice and audio signal from signal sensor 50 through lines 51 and 106. The acoustic echo canceller 60 is preferably an adaptive finite impulse response filter having sufficient tap length to model the acoustic path. The acoustic echo canceller 60 adaptively models the path between the input to the far-end loudspeaker 26 and the output from the far-end microphone 28. The far-end echo cancellation summer 56 thus subtracts from the far-end voice signal in line 54 that portion of the signal due to sound introduced by the far-end speaker 26.

The far-end acoustic echo canceller 60 is again preferably adapted using an LMS update. A multiplier 108 inputs the echo-cancelled far-end voice signal from summer 56 through lines 62 and 110. The multiplier 108 also inputs a regressor signal in line 112. The multiplier multiplies the signals in lines 110 and 112 and outputs an update signal in line 114 which is transmitted to the acoustic echo canceller 60 for adaptation.

The regressor signal in line 114 for the far-end acoustic echo canceller is preferably a combination of the near-end voice signal, the audio signal, and/or a random noise signal. Normally this combination will be carried out in a microprocessor, but FIG. 1 shows summer 116 and switches 118, 122 and 124 for carrying out the combining operations. When switch 118 is closed, the near-end voice signal in line 42 is transmitted through line 43 to summer 116. When switch 122 is closed, the audio signal from the audio source 12 is transmitted through line 123 to summer 116. When switch 124 is closed, random noise from random noise source 125 is transmitted through line 127 to summer 116, and also through line 126 to summer 44. The random noise source 125 is preferably similar to random noise source 97. Signal sensor 50, which monitors the level of the combined near-end voice and audio signal in line 48, controls whether switch 124 is closed, and also controls the level of random noise from random noise source 125 if the switch 124 is closed, all shown schematically by dashed line 128.

Adaptation of the far-end acoustic echo canceller 60 must be frozen when there is far-end talk sensed by microphone 28. Therefore, the far-end acoustic echo canceller 60 should not adapt when the echo-cancelled far-end voice signal in line 62 exceeds a threshold value in gate 64. As discussed above with respect to the near-end acoustic echo canceller 36, it may be desirable to shelter adaptation of the far-end acoustic echo canceller 60 from either the near-end voice signal (by opening switch 118), or the audio signal (by opening switch 122). Also, it will normally be desirable to add random noise from random noise source 125 (i.e. closed switch 124) when the combined near-end voice and audio signal in line 48 exceeds a threshold value so that the additional random noise will be unnoticeable by a person located in the far-end zone 16.

Figure 5:
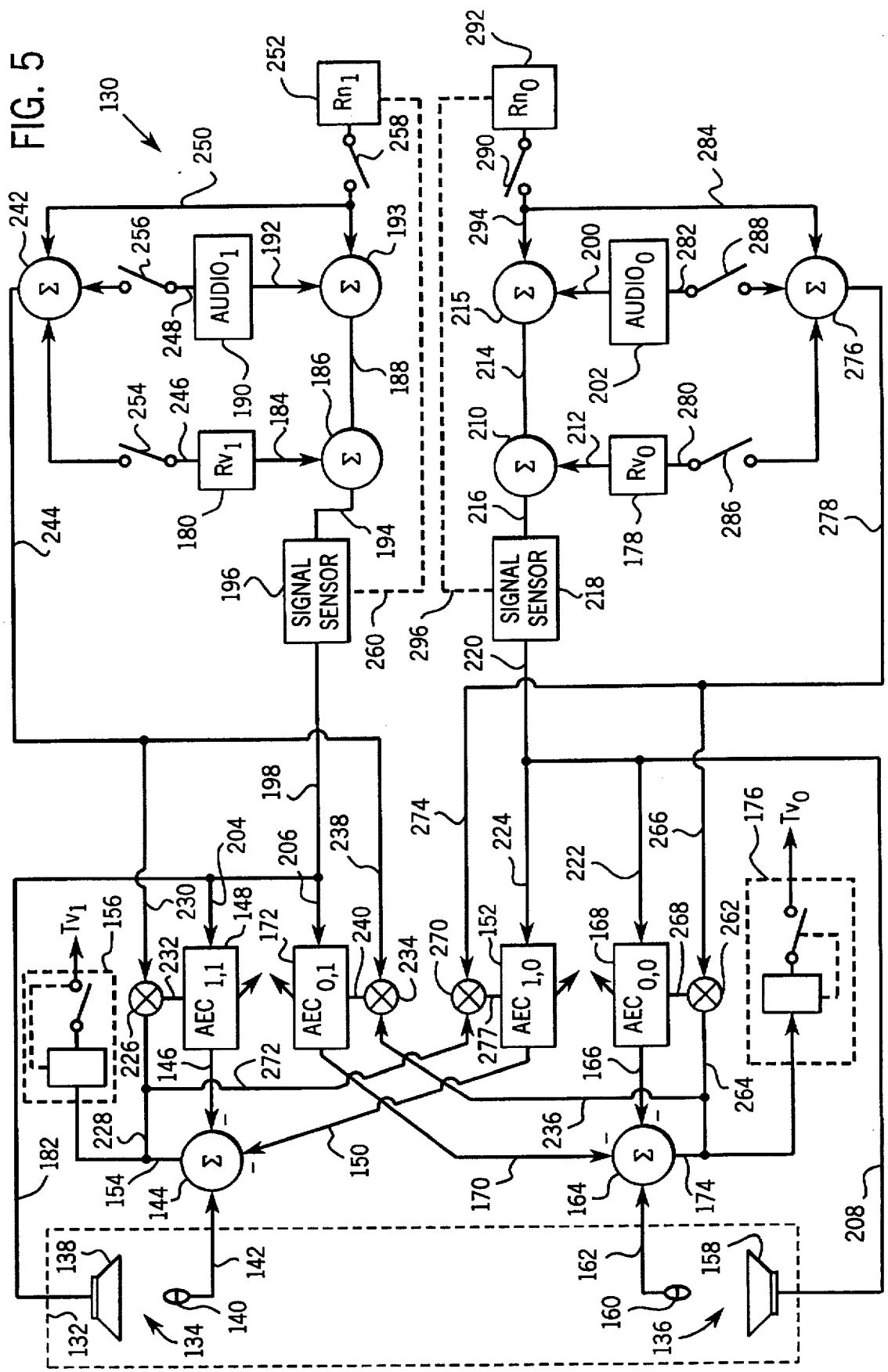
FIG. 5 is a schematic drawing in accordance with the invention showing an integrated intercom and audio system implementing a multiple-channel acoustic echo cancellation system.

FIG. 5 illustrates a multi-channel acoustic echo cancellation system 130 for an integrated intercom and audio system having a near-end zone 132 with two speaking locations 134 and 136. While system 130 illustrates a near-end zone 132, it should be understood that such an integrated intercom and audio system would normally have a far-end zone with two or more speaking locations, and possible additional zones as well. Such a system can be used in a vehicle such as an automobile where the near-end zone is the front seat and the far-end zone is the back seat. Of course, the invention is not limited to the zones being the front and the back seat in an automobile.

Loudspeaker 138 introduces sound into the near-end zone 132 at speaking location 134. Microphone 140 senses sound and speech at speaking location 134, and generates a voice signal which is transmitted through line 142 to a near-end echo cancellation summer 144. The summer 144 also inputs a signal in line 146 from acoustic echo cancellation channel (1,1) designated by block 148, and a signal in line 150 from acoustic echo cancellation channel (1,0) designated by block 152. The summer 144 subtracts the signals in lines 146 and 150 from the voice signal in line 142, and outputs an echo-cancelled voice signal in line 154. The echo-cancelled voice signal in line 154 inputs output gate/switch 156. Output gate/switch 156 opens and terminates (or, alternatively greatly reduces) the transmission of the echo-cancelled voice signal in line 154 if the signal does not exceed the threshold value. A suitable output gate/switch 156 uses a short-time, average magnitude estimating gate function to detect if a voice signal is present in line 154. In this manner, a voice signal will not be transmitted from microphone 140 at speaking location 134 to the one or more far-end zones when speech is not present at the speaking location 134. The transmitted voice signal in line 154 is depicted in FIG. 5 as $Tv_1$.

In a similar manner, loudspeaker 158 introduces sound into zone 132 at speaking location 136. Microphone 160 senses noise in speech at speaking location 136 and generates a voice signal which is transmitted through 162 to an echo cancellation summer 164. Summer 164 receives a signal through line 166 from acoustic echo cancellation channel (0,0) designated by block 168. Summer 164 also receives an echo cancellation signal through line 170 from acoustic echo cancellation channel (0,1) designated by block 172. Summer 164 subtracts the signals in lines 166 and 170 from the voice signal in line 162 and outputs an echo-cancelled voice signal in line 174. The echo-cancelled voice signal in line 174 inputs output gate/switch 176. Output gate/switch 176 opens and terminates (or greatly reduces) the transmission of the echo-cancelled voice signal in line 174 if the signal does not exceed the threshold value. The echo-cancelled voice signal transmitted from output gate/switch 176 is designated as $Tv_0$, and is transmitted to the one or more far-end zones.

Voice signals from speaking locations in the one or more far-end zones can be transmitted to the near-end zone 132 as shown schematically by blocks 178 and 180 labeled $Rv_0$ and $Rv_1$, respectively. Received voice signals $Rv_0$ and $Rv_1$ can be the same signal or independent. Loudspeaker 138 receives a combined voice and audio signal through line 182. A summer 186 inputs a voice signal $Rv_1$ in line 184 and an audio signal in line 188 from audio channel 190, and outputs the combined voice and audio signal in line 194. The combined voice and audio signal in line 194 inputs signal sensors 196 and is transmitted therefrom through line 198 to line 182 and to loudspeaker 138. The audio signal in line 192 is an audio signal from a channel 190 of the audio system, which is typically different than the audio signal in line 200 from audio channel 202. Even though the audio signal in line 192 is typically different than the audio signal in line 200, the signals are likely to be correlated to one another.

The combined voice and audio signal in line 198 inputs acoustic echo cancellation channel (1,1) designated by block 148, through line 204. The acoustic echo cancellation channel (1,1), block 148, models the acoustic path between the input to loudspeaker 138 and the output from microphone 140. The combined voice and audio signal in line 198 also inputs acoustic echo cancellation channel (0,1), block 172, through line 206. The acoustic echo cancellation channel (0,1), block 172, models the acoustic path between the input to speaker 138 and the output from microphone 160.

Loudspeaker 158 receives a combined voice and audio signal in line 208. Summer 210 inputs a voice signal $Rv_0$ in line 212 from the one or more far-end zones, block 178, and also inputs an audio signal in line 214 from summer 215, line 200 and audio source 202. The summer 210 outputs a combined voice and audio signal in line 216. The signal in line 216 inputs signal sensor 218, and signal sensor 218 transmits the combined voice and audio signal to line 220. The combined voice and audio signal is transmitted through lines 220 and 208 to loudspeaker 158. The combined voice and audio signal in line 220 is also transmitted through lines 220 and 222 to acoustic echo cancellation channel (0,0), block 168. The acoustic echo cancellation channel (0,0), block 168, models the acoustic path between the input to loudspeaker 158 and the output from microphone 160. The combined voice and audio signal in line 220 is also transmitted through line 224 to acoustic echo cancellation channel (1,1), block 152. The acoustic echo cancellation channel (1,0), block 152, models the acoustic path between the input to loudspeaker 158 and the output from microphone 140.

Each of the echo cancellation channels 148, 150, 168, 172, are preferably finite impulse response filters having suitable tap length to model the acoustic path, and are preferably adapted using an LMS update. Multiplier 226 inputs an echo-cancelled voice signal from summer 144 through lines 154 and 228 and inputs a regressor signal from line 230. The multiplier 226 multiplies the signals in lines 228 and 230 and outputs an update signal in line 232 which is transmitted to the acoustic echo cancellation channel (1,1), block 148, for adaptation. Likewise, a multiplier 234 inputs an echo-cancelled voice signal from summer 164 through lines 174 and 236, and inputs a regressor signal through line 238. The multiplier 234 multiplies the signals in lines 236 and 238 and outputs an update signal in line 240 which is transmitted to the acoustic echo cancellation channel (0,1), block 172, for adaptation. As shown in FIG. 5, the regressor signals in line 230 and line 238 have the same value and each are output from summer 242 through line 244. The regressor signals in lines 230 and 238 are preferably the combination of one or more of the received voice signal $Rv_1$ in line 246, the audio signal in line 248 from audio channel 190, and/or random noise in line 250 from random noise source 252. In most applications, it will be preferable that the combining operation for the regressor be carried out in a microprocessor, however, FIG. 5 shows the structure of summer 242 and switches 254, 256 and 258 for carrying out the combining operation. Signal sensor 196 monitors the level of the combined voice and audio signal in line 194 and controls whether switch 258 for the random noise source 252 should be closed, shown schematically by dashed line 260. Signal sensor 196 also controls the level of random noise that should be added to the combined voice and audio signal via summer 193 without the potential of a person located in near-end zone 132 noticing the added random noise. When switch 254 is closed, the received voice signal Rx in line 246 is transmitted to summer 242. When switch 256 is closed, the audio signal in line 248 is transmitted to summer 242. When the switch 258 is closed, the random noise signal is transmitted not only to summer 193 but also to summer 242 through line 250. Inasmuch as it is likely that the audio signal in line 248 from audio channel 190 will be correlated with the audio signal in line 200 from audio channel 202, it may be desirable to shelter the regressor signal in line 244 from having an audio signal component. This is done by opening switch 256. Likewise, it may be desirable to shelter the regressor signal in line 244 from the received voice signal in line 246 if that signal is correlated with the received voice signal in line 212. This can be done by opening switch 254. If both the received voice signal in 246 and the audio signal in 248 are sheltered, the regressor signal in line 244 will be a random noise signal from random noise source 252.

Multiplier 262 inputs an echo-cancelled voice signal from summer 164 through lines 174 and 264 and also inputs a regressor signal through line 266. The multiplier 262 multiplies the signals in lines 264 and 266 and outputs an update signal in line 268 that is used to update acoustic echo cancellation channel (0,0), block 168. Multiplier 270 inputs an echo-cancelled voice signal from summer 144 through lines 154 and 272 and also inputs a regressor signal through line 274. The multiplier 270 multiplies the signals in lines 272 and 274 and outputs an update signal in line 277 that is used to update the acoustic echo cancellation channel (1,0), block 152. The regressor signals in lines 266 and 274 have the same value and are transmitted from summer 276 through line 278. The regressor signal in lines 278, 266 and 274 is preferably the combination of one or more of a received voice signal from line 280, an audio signal from line 282, and/or a random noise signal from line 284. When switch 286 is closed, the received voice signal in line 280 inputs summer 276. When switch 288 is closed, the audio signal in line 282 from audio channel 202 inputs summer 276. When switch 290 is closed, a random noise signal from random noise source 292 inputs summer 276 through line 284. It is preferred that random noise source 292 be independent from and totally uncorrelated with random noise source 252. If switch 290 is closed, the random noise signal from random noise source 292 is transmitted not only through line 284 to summer 276, but also through line 294 to summer 215 where it is added to the audio signal in line 200. Signal sensor 218 monitors the level of the combined voice and audio signal in line 216 and closes switch 290 if the level exceeds a threshold value. Sensor 218 can also adjust the level of random noise from random noise source 292 depending on the level of the combined voice and audio signal in line 216 as shown schematically by dashed line 296.

It should be recognized that various equivalents, alternatives, and modifications are possible, and these equivalents, alternatives, and modifications should be considered to be within the scope of the appended claims.

I claim:

1. In a telecommunication system having a near-end zone and a far-end zone, a near-end intercom system having a near-end microphone that senses sound in the near-end zone and a near-end loudspeaker that outputs sound into the near-end zone, and a far-end intercom system having a far-end microphone that senses sound in the far-end zone, and a far-end loudspeaker that outputs sound into the far-end zone, the improvement comprising:

a near-end audio summer that inputs a far-end voice signal from the far-end intercom system and an audio signal from an audio system, and outputs a near-end input signal that is transmitted to the near-end loudspeaker;

an adaptive near-end acoustic echo canceller that receives the near-end input signal and outputs a near-end echo cancellation signal;

a near-end echo cancellation summer that inputs a near-end output signal from a near-end microphone and the near-end echo cancellation signal from the near-end acoustic echo canceller, and outputs an echo-cancelled, near-end voice signal to the far-end intercom system; and a multiplier that receives the echo-cancelled, near-end voice signal and a regressor signal, and outputs an update signal to adapt the acoustic echo canceller;

wherein the regressor signal is formed by the combination of one or more of the far-end voice signal, the audio signal and a random noise signal.

2. The invention as recited in claim 1 wherein the far-end voice signal inputting the near-end audio summer is an echo-cancelled, far-end voice signal.

3. The invention as recited in claim 1 wherein the near-end adaptive echo canceller is an adaptive FIR filter.

4. The invention as recited in claim 1 further comprising:

a random noise switch that can be closed to combine random noise with the regressor signal;

wherein the random noise switch is closed when a combination of the far-end voice signal and the audio signal exceed a threshold noise level.

5. The invention as recited in claim 4 wherein random noise is further combined with the near-end input signal when the random noise switch is closed.

6. The invention as recited in claim 1 further comprising an audio regressor switch that can be closed to combine the audio signal with the regressor signal.

7. The invention as recited in claim 1 further comprising a voice regressor switch that can be closed to combine the far-end voice signal with the regressor signal.

8. The invention as recited in claim 1 further comprising:

a near-end output gate/switch that monitors the near-end voice signal and terminates transmission of the near-end voice signal to the far-end intercom system when the near-end voice signal falls below a threshold value.

9. The invention as recited in claim 1 further comprising:

a near-end output gate/switch that monitors the near-end voice signal and reduces the level of transmission of the near-end voice signal to the far-end intercom system when the near-end voice signal falls below a threshold value.

10. A multi-channel telecommunications system comprising:

a plurality of zones;

one or more speaking locations in each zone;

a plurality of microphones, each sensing speech at a respective speaking location and outputting a voice signal;

an audio source that provides a plurality of audio signals;

a plurality of acoustic echo cancellers, each outputting an echo cancellation signal and being capable of inputting a combined voice and audio signal from the audio source and a respective microphone;

a plurality of speakers, each inputting one of the combined voice and audio signals and introducing sound into a respective zone at a respective speaking location;

a plurality of echo cancellation summers, each corresponding to a respective microphone, each echo cancellation summer inputting the respective voice signal from the respective microphone and an echo cancellation signal from each adaptive echo canceller associated with the zone in which the microphone is located, and outputting an echo-cancelled voice signal; and a multiplier associated with each acoustic echo canceller, each multiplier receiving an echo-cancelled voice signal and a regressor signal, and outputting an update signal to the respective acoustic echo canceller;

wherein the acoustic echo canceller inputs a combined voice and audio signal and the regressor signal does not include the audio signal.

11. A multi-channel telecommunications system as recited in claim 10 wherein the regressor signal for each acoustic echo canceller includes random noise when the combination of the voice signal and the audio signal exceeds a threshold noise value.

12. A multi-channel telecommunications system as recited in claim 11 wherein the level of random noise increases as the level of the combined voice signal and audio signal increases.

13. A multi-channel telecommunications system as recited in claim 10 further comprising:

a random noise switch that can be closed to combine random noise with the regressor signal.

14. A multi-channel telecommunications system as recited in claim 10 further comprising:

an output gate associated with each microphone that monitors the level of the echo-cancelled voice signal and terminates transmission of the echo-cancelled voice signal when the echo-cancelled voice signal falls below a threshold value.

15. A multi-channel telecommunications system recited in claim 10 further comprising:

an output gate/switch associated with each microphone that monitors the level of the echo-cancelled voice signal and reduces the level of transmission of the echo-cancelled voice signal when the echo-cancelled voice signal falls below a threshold value.

16. A multi-channel telecommunications system as recited in claim 10 wherein each of the zones in a vehicle.

17. A multi-channel telecommunications system as recited in claim 16 wherein there are two zones and two speaking locations in each zone.

18. A multi-channel telecommunications system as recited in claim 10 further comprising a voice regressor switch that can be closed to combine the voice signal with the regressor signal.

19. In a multi-channel telecommunications system having one or more speaking locations in a plurality of zones, a plurality of microphones, each sensing speech at a respective speaking location, and a plurality of loudspeakers, each introducing sound into a respective zone at a respective speaking location, a method of acoustic echo cancellation comprising the steps of:

outputting a voice signal from each respective microphone in response to speech in the respective speaking location;

combining each respective voice signal with one or more audio signals;

transmitting each combined voice and audio signal to at least one speaker located in other zones;

adaptively modeling the acoustic path between each speaker and each microphone located in each respective zone;

cancelling the echo in a voice signal from each respective microphone by filtering the combined voice and audio signals transmitted to the speaker in the same speaking location through the respective adaptive model for the acoustic path and subtracting the filtered signal from the respective voice signal; and updating each adaptive model by multiplying the respective echo-cancelled voice signal by a regressor signal wherein the regressor signal is sheltered to not include any audio signal components.

20. A method as recited in claim 19 further comprising the step of:

adding random noise to the regressor signal when the combined value of the voice signal from the other zone and the audio signal exceed threshold value.

21. A method as recited in claim 20 further comprising the step of:

reducing the level of transmission of the echo-cancelled voice signal to the other zones when the echo-cancelled voice signal is less than a threshold value.

22. A method as recited in claim 20 further comprising the step of:

terminating the transmission of the echo-cancelled voice signal to the other zones when the echo-cancelled voice signal is less than a threshold value.

* * * * *